(12) United States Patent
Rosa et al.

(10) Patent No.: US 10,384,701 B2
(45) Date of Patent: Aug. 20, 2019

(54) MANAGING A SUPPLY OF GASEOUS FUEL ON A TENDER CAR

(71) Applicant: Westport Power Inc., Vancouver (CA)

(72) Inventors: Jose F. Rosa, Vancouver (CA); Stefan Barthel, Berlin (DE); Bradley E. Melanson, Vancouver (CA)

(73) Assignee: WESTPORT POWER INC., Vancouver (CA)

(*) Notice: Subject to any disclaimer, the term of this patent is extended or adjusted under 35 U.S.C. 154(b) by 189 days.

(21) Appl. No.: 15/108,220

(22) PCT Filed: Dec. 17, 2014

(86) PCT No.: PCT/CA2014/051233
§ 371 (c)(1),
(2) Date: Jun. 24, 2016

(87) PCT Pub. No.: WO2015/095956
PCT Pub. Date: Jul. 2, 2015

(65) Prior Publication Data
US 2016/0325769 A1 Nov. 10, 2016

(30) Foreign Application Priority Data
Dec. 24, 2013 (CA) .................................. 2838145

(51) Int. Cl.
*B61L 27/04* (2006.01)
*B61C 17/02* (2006.01)
(Continued)

(52) U.S. Cl.
CPC .............. *B61L 27/04* (2013.01); *B61C 5/00* (2013.01); *B61C 17/02* (2013.01); *F02D 19/023* (2013.01);
(Continued)

(58) Field of Classification Search
CPC . B61L 27/04; B61C 5/00; B61C 17/02; B61C 7/00; F02D 19/023; F02D 19/025;
(Continued)

(56) References Cited

U.S. PATENT DOCUMENTS 5,887,567 A 3/1999 White et al.
6,408,766 B1 6/2002 McLaughlin et al.
(Continued)

FOREIGN PATENT DOCUMENTS

CN 101674966 A 3/2010
EP 2 154 044 A2 2/2010
(Continued)

OTHER PUBLICATIONS

Chinese Office Action, dated Jan. 17, 2018, for Chinese Application No. 2014800710066, 11 pages (with English translation).
(Continued)

*Primary Examiner* — Bao Long T Nguyen
(74) *Attorney, Agent, or Firm* — Seed IP Law Group LLP

(57) ABSTRACT

A supply of gaseous fuel on a tender car for fuelling a locomotive engine requires the coordination of a variety of operational modes to improve the safety and efficiency when operating components for delivering, refueling, draining, capturing and storing gaseous fuel. A method and apparatus for managing a supply of gaseous on a tender car comprises receiving on the tender car a command signal from the locomotive commanding delivery of gaseous fuel from the tender car to the locomotive; transferring from the tender car at least one status signal to the locomotive indicating 1 status of the tender car; representing a plurality of operational modes of the tender car as a plurality of states; and transitioning between the plurality of states in response to the command signal and the at least one status signal.

16 Claims, 2 Drawing Sheets

(51) Int. Cl.
*F02M 21/02* (2006.01)
*F02D 19/02* (2006.01)
*B61C 5/00* (2006.01)

(52) U.S. Cl.
CPC ......... *F02D 19/025* (2013.01); *F02M 21/029* (2013.01); *F02M 21/0212* (2013.01); *F02M 21/0215* (2013.01); *F02M 21/0218* (2013.01); *F02M 21/0287* (2013.01); *Y02T 10/32* (2013.01)

(58) Field of Classification Search
CPC ........... F02M 21/0212; F02M 21/0287; F02M 21/029; F02M 21/00–21/0209; F02M 21/0215–21/0218; Y02T 10/32; F17C 70/0173; F17C 2250/03; F17C 2250/04
USPC ....................... 701/19, 36; 105/9, 231, 26.05
See application file for complete search history.

(56) References Cited

U.S. PATENT DOCUMENTS

| | | | | |
|---|---|---|---|---|
| 8,958,972 | B1* | 2/2015 | Fisher | B61C 17/12 701/103 |
| 9,145,149 | B2* | 9/2015 | Frazier | B61C 3/00 |
| 9,611,981 | B2* | 4/2017 | Billig | F17C 7/00 |
| 9,821,819 | B2* | 11/2017 | Frazier | B61C 17/12 |
| 9,863,365 | B2* | 1/2018 | Melanson | F02G 5/04 |
| 2006/0138285 | A1 | 6/2006 | Oleski et al. | |
| 2010/0175579 | A1 | 7/2010 | Read | |
| 2013/0245864 | A1* | 9/2013 | Frazier | B61C 3/00 701/19 |
| 2013/0261842 | A1 | 10/2013 | Cooper et al. | |
| 2014/0033738 | A1* | 2/2014 | Billig | F17C 7/00 62/48.1 |
| 2014/0033946 | A1* | 2/2014 | Billig | F17C 7/00 105/35 |
| 2014/0299101 | A1* | 10/2014 | Melanson | F17C 5/06 123/445 |
| 2014/0358336 | A1* | 12/2014 | Otsubo | B61C 17/12 701/19 |
| 2015/0057845 | A1* | 2/2015 | Fisher | G01F 17/00 701/19 |
| 2015/0083055 | A1* | 3/2015 | Melanson | F02M 21/02 123/2 |
| 2016/0129925 | A1* | 5/2016 | Jensen | B61L 3/006 701/19 |
| 2017/0184056 | A1* | 6/2017 | Melanson | F02M 21/0221 |

FOREIGN PATENT DOCUMENTS

| | | |
|---|---|---|
| WO | 2011/050125 A1 | 4/2011 |
| WO | 2013/138734 A1 | 9/2013 |

OTHER PUBLICATIONS

Chinese Search Report, dated Jan. 9, 2018, for Chinese Application No. 2014800710066, 4 pages (with English translation).
International Search Report and Written Opinion of the International Searching Authority, dated Mar. 30, 2015, for International Application No. PCT/CA2014/051233.
Office Action, dated Oct. 1, 2014, for Canadian Application No. 2,838,145, 3 pages.
Office Action, dated Mar. 27, 2015, for Canadian Application No. 2,838,145, 5 pages.

* cited by examiner

MANAGING A SUPPLY OF GASEOUS FUEL ON A TENDER CAR

JOINT RESEARCH AGREEMENT

The subject matter claimed herein was made as a result of activities undertaken within the scope of a joint research agreement. The parties to the joint research agreement are (1) Electro-Motive Diesel, Inc. and (2) Westport Power, Inc.

FIELD OF THE INVENTION

The present application relates to a technique of managing a supply of gaseous fuel on a tender car for a locomotive, and more specifically to managing the coordination of various modes of operation of the tender car.

BACKGROUND OF THE INVENTION

Liquefied natural gas (LNG) is increasingly being considered as a fuel for locomotive engines. LNG is a gaseous fuel that is defined herein as any fuel that is in a gas state at standard temperature and pressure, which for the purpose of this disclosure is defined as 20 degrees Celsius (° C.) and 1 atmosphere (atm) respectively. A gaseous fuel may also be referred to as a gas in this disclosure. Emissions can be reduced and the cost of fuelling lowered when these engines are fuelled with LNG compared to being fuelled with diesel.

In conventionally fuelled locomotives, diesel is stored in tanks that are located on the locomotive. A locomotive engine controller controls a fuel pump that delivers diesel at predetermined pressures to the engine. In locomotives that fuel with LNG, the liquefied gaseous fuel is stored in specially constructed tanks on a tender car connected with the locomotive. In applications that require more power than one locomotive can provide, or more fuel than one tender car can provide, one or more tender cars can store gaseous fuel for one or more locomotives.

The delivery of gaseous fuel from the tender car to the locomotive engine is inherently more complicated compared to delivering diesel fuel, for a variety of reasons. There can be delays in delivering gaseous fuel to the locomotive due to start-up delays for a cryogenic pump that must be cooled before it can efficiently pump liquefied gaseous fuel. Gaseous fuel is delivered from a tender car that is detachable from the locomotive. Safety issues must be taken into consideration to ensure that gaseous fuel does not escape the fuelling system in the event the tender car separates from the locomotive. The distance traveled by the gaseous fuel between where it is stored and where it is combusted is considerably greater, which has the potential to further adversely affect start-up delays and increases the likelihood of gaseous fuel venting after shut-down. Normally, the gaseous fuel is converted from the liquid state to the gas or supercritical state before it is introduced to either the intake system or combustion chambers of the locomotive engine. Gaseous fuel pressure and temperature are regulated such that fuel injection metering can be controlled. This comprises controlling the cryogenic pump to maintain the pressure of the fuel within predetermined ranges, and to ensure the temperature of the fuel delivered to the engine is above a predetermined minimum value such that fuel system components are not damaged and to prevent freezing.

U.S. Pat. No. 5,887,567, issued Mar. 30, 1999 to White et al. (hereinafter White), discloses a natural gas fuelling system for cryogenic fluids between a container of fuel carried on a flat car and a locomotive. Two configurations for delivering LNG from the container to the locomotive are disclosed. In a first configuration a control system on a skid frame located on the flat car delivers vaporized gaseous fuel to the locomotive. The control system comprises one or more pumps, meters, controls and vaporizers. In a second configuration, liquid LNG is supplied to combustion chambers of the locomotive engine. Nowhere does White disclose how the control system functions over the many operational states of both the locomotive engine and the tender car.

The state of the art is lacking in techniques for managing a supply of gaseous fuel on a tender car during the various operational modes of the tender car. The present method and apparatus provides an improved technique for managing supplies of gaseous fuel on tender cars.

SUMMARY OF THE INVENTION

An improved apparatus for managing a supply of gaseous fuel on a tender car for a locomotive comprises a tender controller configured to interface with a pumping and vaporizing apparatus and a communication link for exchanging information with a locomotive controller. The tender controller is programmed (1) to receive a command signal from the locomotive controller through the communication link commanding delivery of gaseous fuel from the tender car to the locomotive; (2) to transfer at least one status signal through the communication link to the locomotive controller indicating status of the tender car; and (3) with a state machine for managing a plurality of operational modes of the tender car. The state machine is responsive to the command signal and the at least one status signal to transition between respective operational modes. The communication link can comprise at least one of a digital interface, an analog interface, a synchronous communication bus and an asynchronous communication bus. The communication link is preferably separable from the tender car. The gaseous fuel can be at least one of butane, ethane, hydrogen, methane, propane, natural gas and mixtures of these fuels.

In a preferred embodiment, the tender controller is further programmed to receive a status signal from the locomotive controller. The status signal is a locomotive handshake signal to tender car and the command signal is a gaseous fuel request signal. The at least one status signal comprises a tender car to locomotive handshake signal, a tender car fault free signal and a tender car ready signal indicating the tender car is ready to deliver gaseous fuel.

The state machine comprises a plurality of states representative of the plurality of operational modes. The plurality of states comprises at least one of: a standby state, a start-up state, a deliver state, a refill state, a disabled state, and a drain state. The tender controller can be further programmed to disable delivery of gaseous fuel to the locomotive when the state machine is in one of the standby state, the start-up state, the refill state, the disabled state and the drain state. The tender controller can be further programmed to disable delivery of gaseous fuel to the locomotive when the locomotive controller sends a shutdown signal to the tender controller. The tender controller can be configured to actuate at least one valve in fill piping and programmed to command the at least one valve open when the state machine is in the refill state. The tender controller can be configured to actuate at least one valve in a drain piping and programmed to command the at least one valve open when the state machine is in the drain state.

An improved method of managing a supply of gaseous fuel on a tender car for a locomotive comprises receiving a command signal from the locomotive on the tender car commanding delivery of gaseous fuel from the tender car to the locomotive; transmitting at least one status signal from the tender car to the locomotive indicating status of the tender car; representing a plurality of operational modes of the tender car as a plurality of states; and transitioning between the plurality of states in response to the command signal and the at least one status signal.

In a preferred embodiment the method further comprises receiving a status signal from the locomotive. The status signal is a locomotive handshake signal to the tender car and the command signal is a gaseous fuel request signal. The at least one status signal comprises a tender car handshake signal to the locomotive, a tender car fault free signal and a tender car ready signal indicating the tender car is ready to deliver gaseous fuel.

The plurality of states comprises at least one of a standby state, a start-up state, a deliver state, a refill state, a disabled state, and a drain state. The method can further comprise disabling delivery of gaseous fuel to the locomotive when a current state of the locomotive is at least one of the standby state, the start-up state, the refill state, the disabled state and the drain state. The method can further comprise disabling delivery of gaseous fuel to the locomotive when the locomotive sends a shutdown signal to the tender car. The method can further comprise commanding at least one valve in fill piping open when a current state of the locomotive is the refill state. The method can further comprise commanding at least one valve in drain piping open when a current state of the locomotive is the drain state.

DETAILED DESCRIPTION OF PREFERRED EMBODIMENT(S)

Figure 1:
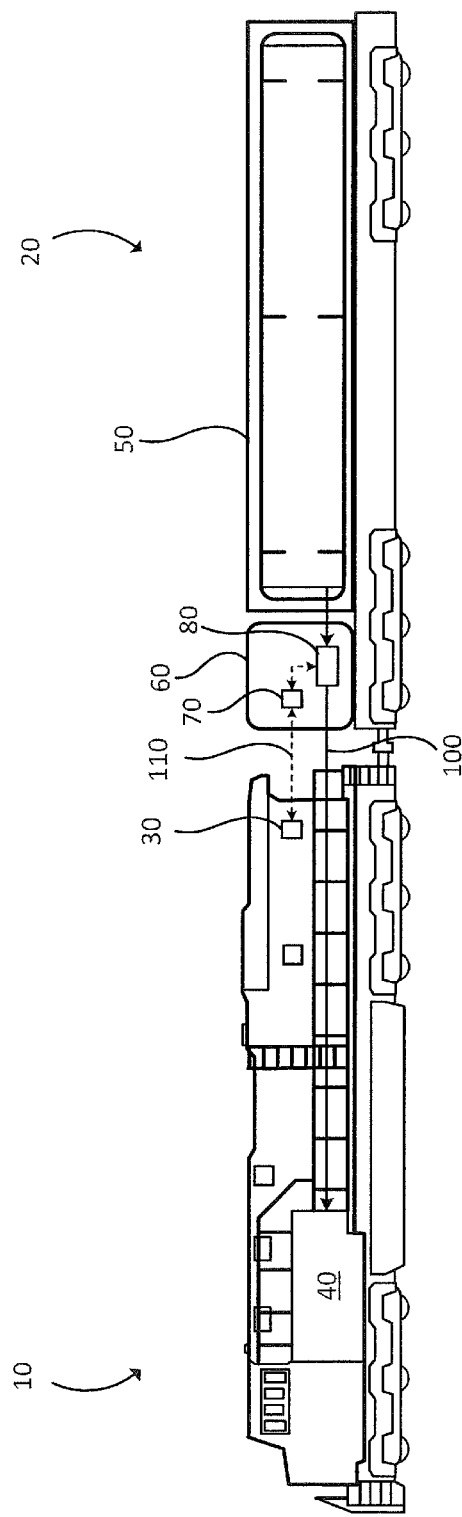
FIG. 1 is a schematic view of a locomotive and a tender car according to one embodiment.

Referring to FIG. 1, there is shown locomotive 10 connected with tender car 20. Locomotive controller 30 controls the operation of engine 40. Gaseous fuel supply module 60 controls the delivery of gaseous fuel between cryogenic vessel 50 and engine 40. Pumping and vaporizing apparatus 80 comprises a cryogenic pump (not shown) and a vaporizer (not shown) for pressurizing and vaporizing respectively a liquefied gaseous fuel stored in cryogenic vessel 50. Exemplary liquefied gaseous fuels are LNG and liquefied methane, as wells mixtures of these fuels with other gaseous fuels. As would be known to those skilled in the technology there are a variety of other components in pumping and vaporizing apparatus 80, which are employed in low pressure gaseous fuel systems and/or high pressure gaseous fuel systems. Tender controller 70 controls the operation of pumping and vaporizing apparatus 80 to take the gaseous fuel from cryogenic vessel 50 where it is stored in the liquid state and deliver it through conduit 100 to engine 40 in the gas or supercritical state. Controllers 30 and 70 are configured to interface with communication link 110 to exchange information therebetween. Communication link 110 can comprise at least one of a digital interface, an analog interface, a synchronous communication bus and an asynchronous communication bus. In a preferred embodiment communication link 110 is a bi-directional communication link where locomotive controller 30 sends information to tender controller 70, and tender controller 70 sends information to locomotive controller 30. Communication link 110 comprises a coupling so that it is separable from either controller 30 or 70 in the event tender car 20 separates from locomotive 10.

Locomotive controller 30 and tender controller 70 each can comprise hardware and software components. The hardware components can comprise digital and/or analog electronic components. In the embodiments herein locomotive controller 30 and tender controller 70 each comprise a processor and memories, including one or more permanent memories, such as FLASH, EEPROM and a hard disk, and a temporary memory, such as SRAM and DRAM, for storing and executing a program. As used herein, the terms algorithm and state machine refer to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
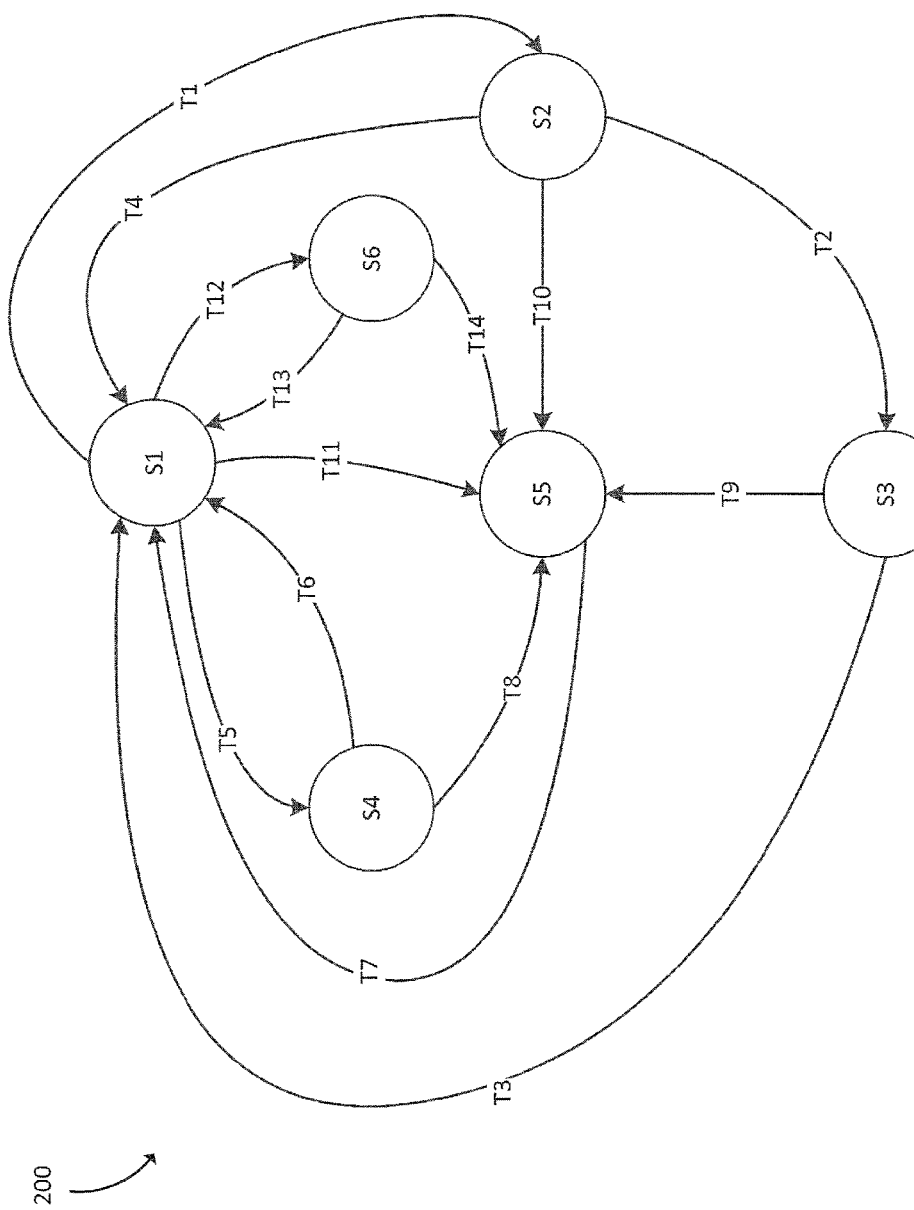
FIG. 2 is a state diagram view of a control system programmed in a tender controller of the tender car of FIG. 2.

Referring now to FIG. 2, control system 200 for managing a supply of gaseous fuel on tender car 20 is shown according to one embodiment. Control system 200 comprises an algorithm in the form of a state machine programmed in tender controller 70 that is responsive to requests from locomotive controller 30 sent through communication link 110 and to signals from sensors in and around cryogenic vessel 50 and pumping and vaporizing apparatus 80 (collectively "the sensors") representative of a plurality of operating parameters of tender car 20. States S1, S2, S3, S4, S5 and S6 (collectively S1-6) represent management states for the supply of gaseous fuel on tender car 20, which are also referred to as operating modes for tender car 20. Transitions T1, T2, T3, T4, T5, T6, T7, T8, T9, T10, T11, T12, T13 and T14 (collectively T1-14) represent transitions between respective pairs of states S1-6 that occur when respective predetermined criteria are met. Predetermined criteria can be signals received from locomotive controller 30, from the sensors, from manual inputs as well as from other sources as will be described in more detail below.

States S1-6 are now discussed in more detail. The definitions of states S1-6 are summarized in Table 1 below. State S1 is referred to as "Standby" and is the initial state when tender controller 70 powers up. In this state no faults have been detected and tender controller 70 is waiting for inputs in the form of signals from locomotive controller 30, sent over communication link 110, and from the sensors in order to transition to other states. State S2 is referred to as "Start-up" and is the state where tender controller 70 prepares tender car 20 to be able to deliver gaseous fuel to locomotive 10. Components in pumping and vaporizing apparatus 80 can require time to bring devices to operating temperature prior to being fully functional. That is, the pumping chamber needs to be cooled to cryogenic temperatures and there must be sufficient heat available in the vaporizer to prevent freezing when the liquefied gas is introduced. Accordingly, in state S2, the sensors are monitored for various operating parameters such as gaseous fuel level and/or amount, available coolant flow and ambient temperature such that the liquefied gaseous fuel can be vaporized and pressurized to one or more predetermined target values within a range of tolerance suitable for delivery to engine 40. State S3 is referred to as "Deliver" and in this state gaseous fuel can be supplied to engine 40 such that gaseous fuel pressure is maintained at the predetermined target value within the range of tolerance. State S4 is referred to as "Refill" and is the state where cryogenic vessel 50 is to be or is being (re)filled (also known has 'refueled' herein) with liquefied gaseous fuel, for example from a refueling facility. During this state delivery of gaseous fuel over conduit 100 to engine 40 is suspended. The level and/or amount of liquefied gaseous fuel in cryogenic vessel 50 is monitored to determine when the refill operation is completed. It is possible that the refueling facility can detect when cryogenic vessel 50 is full, for example based on back pressure or fluid flow rate through a filling pipe (not shown), and can notify tender controller 70 accordingly. Alternatively, or additionally, tender controller 70 can monitor the refilling process directly by receiving signals from the sensors and can provide feedback to the refill operator (for example at the refueling facility). Tender controller 70 commands one or more valves (not shown) that open passageways through fill piping that allows cryogenic vessel 50 to be refilled. State S5 is referred to as "Disabled" and is the state entered when tender controller 70 is unable to maintain gaseous fuel pressure at the predetermined target value within the range of tolerance, or tender controller 70 cannot maintain normal operation of tender car 20, that is the proper functioning of the tender car in any of the other states. There are a variety of faults that can cause control system 200 to enter and remain in state S5. Non-limiting examples of such faults comprise limited or no gaseous fuel flow from cryogenic vessel 50 through conduit 110; lack of electrical power or air supply; a mechanical, sensor or control system failure; and detection of a gaseous fuel leak or thermal event. State S6 is referred to as "Drain" and is the state where cryogenic vessel 50 is to be or is being drained of liquefied gaseous fuel. During this state delivery of gaseous fuel over conduit 100 to engine 40 is suspended. Tender controller 70 controls one or more valves (not shown) to allow liquefied gaseous fuel to drain through drain piping (not shown) and monitors the level of liquefied gaseous fuel and/or vapor pressure in cryogenic vessel 50 to determine when the vessel is empty. In alternative embodiments the fill piping and the drain piping can be the same piping, or they can share a portion of the same piping. Cryogenic vessel 50 is drained, for example, when tender car 20 is being serviced. There are a variety of ways cryogenic vessel 50 can be drained. Preferably, the liquefied gaseous fuel is returned to a storage or refueling facility due to the large quantity of fuel that can be present in the vessel. Tender controller 70 can provide the liquefied gaseous fuel level and/or vapor pressure in cryogenic vessel 50 to the storage or refueling facility while the draining operation is proceeding.

TABLE 1

| State | Name | Short Description |
|---|---|---|
| S1 | Standby | No critical faults detected. Awaiting notification from locomotive to request gaseous fuel supply. |
| S2 | Start-up | Tender car is preparing to deliver gaseous fuel to locomotive. |
| S3 | Deliver | Tender car able to deliver gaseous fuel to locomotive at one or more predetermined pressures within a range of tolerance. |
| S4 | Refill | Cryogenic vessel is to be refilled or is refilling. Gaseous fuel delivery to locomotive is disabled. |
| S5 | Disabled | Fault(s) detected, unable to maintain gaseous fuel pressure or normal operation. |
| S6 | Drain | Cryogenic vessel is to be drained or is draining. Gaseous fuel delivery to locomotive is disabled. |

The predetermined criteria causing transitions T1-14 are now discussed in more detail. As mentioned hereinbefore, locomotive controller 30 transmits command and status signals over communication link 110 to tender controller 70. Similarly, tender controller 70 generates status signals based on signals received from the sensors on tender car 20 and transmits specified ones of these status signals to locomotive controller 30 through communication link 110. These command and status signals from locomotive controller 30 and tender controller 70, as well as signals from other sources, are input into control system 200 and are made to cause respective transitions T1-14 between respective states S1-6. In a preferred embodiment the signals causing transitions T1-14 are tabulated in Table 2 below. The signals in Table 2 are binary-type signals that can have true and false values. In other embodiments other signal types can be employed that provide equivalent information to tender controller 70, and a variety of types of signals can be employed in control system 200. When the signals in Table 2 have a true value, this refers to the signal description being true. For example, when signal SIG1 ("Tender Handshake") is true tender controller 70 is sending a handshake signal to locomotive controller 30 indicating that it is connected to communication link 110 and is ready to respond to command and status signals from locomotive controller 30, and when signal SIG1 is false it is not ready to respond to command and status signals. Similarly, when signal SIG5 ("Locomotive Handshake") is true locomotive controller 30 is sending a handshake signal to tender controller 70 indicating that it is connected to communication link 110 and is ready to respond to command and status signals from tender controller 70, and when signal SIG5 is false it is not ready to respond to command and status signals. In other embodiments handshake signals SIG1 and SIG5 can be alternating-type signals that provide respective handshakes to respective controllers 30 and 70 by continuously alternating between two or more values. When signal SIG2 ("Gas Request") is true then locomotive controller 30 is requesting that gaseous fuel be delivered to locomotive 10, and when it is false it is not requesting that gaseous fuel be delivered. When SIG3 ("Fault Free") is true then tender car 20 is fault free, and when it is false there is at least one fault on the tender car preventing normal functioning. When signal SIG4 ("Ready") is true then tender car 20 is ready to deliver gaseous fuel to locomotive 10, and when it is false it is not ready. When signal SIG6 ("Refill") is true then tender car 20 is to be refueled, and when it is false it is not to be refueled. Signal SIG6 can be true before and during refueling, and after refueling has completed or is to be interrupted signal SIG6 becomes or is false. When signal SIG7 ("Drain") is true then tender car 20 is to be drained or is draining, and when it is false it is not to be drained. Signal SIG7 can be true before and during draining, and after draining has completed or is to be interrupted signal SIG7 becomes or is false. The "Source" column in Table 2 indicates whether the signal originates in locomotive controller 30 or in tender controller 70.

TABLE 2

| Signal | Name | Short Description | Source |
|---|---|---|---|
| SIG1 | Tender Handshake | Tender car handshake signal to locomotive | Tender controller 70 |
| SIG2 | Gas Request | Locomotive is requesting delivery of gaseous fuel. | Locomotive Controller 30 |
| SIG3 | Fault Free | Tender car is fault free and within normal operating parameters. | Tender controller 70 |
| SIG4 | Ready | Tender car is ready to deliver gaseous fuel | Tender controller 70 |
| SIG5 | Locomotive | Locomotive handshake signal to | Locomotive |

TABLE 2-continued

| Signal | Name | Short Description | Source |
| --- | --- | --- | --- |
| SIG6 | Handshake Refill | tender car. Cryogenic vessel refill command for tender car, which can be true before and during refueling. | Controller 30 Operator, facility controller, the sensors, switch |
| SIG7 | Drain | Cryogenic vessel drain command for tender car, which can be true before and during draining. | Operator, facility controller, the sensors, switch |

Returning to FIG. 2, transitions T1-14 are now discussed in more detail. The signals and their values causing transitions T1-14 are summarized in Table 3 below. Transition T1 refers to control system 200 transitioning from state S1 ("Standby") to state S2 ("Start-up"), which occurs when tender controller 70 receives signal SIG2 ("Gas Request") with a true value. In state S2 tender controller 70 prepares components in pumping and vaporizing apparatus 80 for operation. For example, in a preferred embodiment pumping and vaporizing apparatus 80 comprises a cryogenic pump external to vessel 50. Tender controller 70 commands pumping and vaporizing apparatus 80 to begin cooling the cryogenic pump to reduce vaporization of liquefied gaseous fuel when delivered to the cryogenic pump, thereby improving pumping efficiency. Pump performance and efficiency are reduced when the cryogenic pump is pumping both liquefied and vaporized gaseous fuel. When the cryogenic pump is internal to vessel 50 the start-up time of the cryogenic pump can be reduced. In certain applications there can be other components in pumping and vaporizing apparatus 80 that require a "warm-up" period, such as hydraulic pumps and heat sources for the vaporizer.

Transition T2 refers to control system 200 transitioning from state S2 ("Start-up") to state S3 ("Deliver"), which occurs when tender controller 70 detects that pumping and vaporizing apparatus 80 is ready to deliver gaseous fuel to locomotive 10 within a predetermined efficiency. The cryogenic pump and associated piping in apparatus 80 have been cooled or are cooled such that the likelihood of vaporizing liquefied gaseous fuel upstream or within the cryogenic pump is reduced. Other components requiring a "start-up" procedure are ready for operation. Tender controller 70 generates signal SIG4 ("Ready") with a true value when gaseous fuel is ready to be delivered.

Transition T3 refers to control system 200 transitioning from state S3 ("Deliver") to state S1 ("Standby"), which occurs when tender controller 70 receives signal SIG2 ("Gas Request") with a false value. This can occur when locomotive controller 30 is requesting a shutdown. When control transitions from state S3 to state S1, or from any state where gaseous fuel is present in conduit 100 to state S1, tender controller 70 can actuate components (not shown) in gaseous fuel supply module 60 to capture gaseous fuel in conduit 100 ("shutdown gas") and return it to cryogenic vessel 50; alternatively, or additionally, the shutdown gas (at least a portion thereof) can be directed to an accumulator (not shown) for temporary storage and later recovery, introduction into engine 40, or otherwise used, for example to fuel an auxiliary power unit. The distance between tender car 20 and locomotive 10 means that there can be a relatively large amount of gaseous fuel in conduit 100, which if allowed to vent to atmosphere would be wastefully increasing greenhouse gas emissions and possibly violate emission regulations in some jurisdictions. By capturing and storing shutdown gas, venting to atmosphere is reduced and overall fuel efficiency is increased.

Transition T4 refers to control system 200 transitioning from state S2 ("Start-up") to state S1 ("Standby"), which occurs when tender controller 70 receives signal SIG2 ("Gas Request") with a false value. Similar to transition T3, transition T4 can occur when locomotive controller 30 is requesting a shutdown. Shutdown gas in conduit 100 can be captured and stored for later recovery, introduction to engine 40, or for other uses.

Transition T5 refers to control system 200 transitioning from state S1 ("Standby") to state S4 ("Refill"), which occurs when tender controller 70 receives a refueling signal with a true value from the sensors or a switch on tender car 20, or from a refueling facility (either from a facility controller or an operator's manual input) indicating that refueling is to begin. A detection strategy can be employed by tender controller 70 to detect the connection of piping between cryogenic vessel 50 and the refueling facility and the readiness of tender car 20 to receive liquefied gaseous fuel, such that tender controller 70 can command the one or more valves in the fill piping to open. Normally, engine 40 is not operating while cryogenic vessel 50 is being refilled.

Transition T6 refers to control system 200 transitioning from state S4 ("Refill") to state S1 ("Standby"), which occurs when tender controller 70 receives the refueling signal with a false value before or during the refueling process, or after the refueling process has completed. A detection strategy can be employed by tender controller 70 to detect the completion of refueling, such that tender controller 70 can command the one or more valves in the fill piping to close.

Transition T7 refers to control system 200 transitioning from state S5 ("Disabled") to state S1 ("Standby"). Tender controller 70 generates signal SIG3 ("Fault Free") with a true value, which is subsequently transmitted to locomotive controller 30, whenever the current state changes from state S5 ("Disabled") to another state. This transition occurs when tender controller 70 determines there are no faults after the cause of the fault is removed, or repaired or no longer exists and, if required, tender controller 70 has received an operator's input acknowledging the fault.

Transition T8 refers to control system 200 transitioning from state S4 ("Refill") to state S5 ("Disabled"). Tender controller 70 generates signal SIG3 ("Fault Free") with a false value, which is subsequently transmitted to locomotive controller 30, whenever the current state changes from any other state to state S5 ("Disabled"). This occurs when tender controller 70 detects a fault condition. In transition T8, this can occur when tender controller 70 determines that refueling can no longer continue, which can be due to the variety of faults described in the discussion of state S5 above. Tender controller 70 can command the one or more valves in the fill piping to close when leaving state S4.

Transition T9 refers to control system 200 transitioning from state S3 ("Deliver") to state S5 ("Disabled"). This can occur when tender controller 70 detects a fault condition that can be due to the variety of faults described in the discussion of state S5 above. Depending upon the type of fault, tender controller 70 can actuate the components in gaseous fuel supply module 60 to return shutdown gases to cryogenic vessel 50 or the accumulator. For example, some faults may not require that engine 40 in locomotive 10 shutdown, such that gaseous fuel pressure is maintained in conduit 100 during state S5.

Transition T10 refers to control system 200 transitioning from state S2 ("Start-up") to state S5 ("Disabled"). This can occur when tender controller 70 detects a fault condition that can be due to the variety of faults described in the discussion of state S5 above.

Transition T11 refers to control system 200 transitioning from state S1 ("Standby") to state S5 ("Disabled"). This can occur when tender controller 70 detects a fault condition that can be due to the variety of faults described in the discussion of state S5 above.

Transition T12 refers to control system 200 transitioning from state S1 ("Standby") to state S6 ("Drain"), which occurs when tender controller 70 receives a draining signal with a true value from the sensors or a switch on tender car 20, or from a refueling/storage facility (either from the facility controller or the operator's manual input) indicating that draining is to begin. A detection strategy can be employed by tender controller 70 to detect the connection of piping between cryogenic vessel 50 and the refueling/storage facility and the readiness of tender car 20 to drain and/or the facility's readiness to accept liquefied gaseous fuel, such that tender controller 70 can command the one or more valves in the drain piping to open. Normally, engine 40 is not operating while cryogenic vessel 50 is being drained.

Transition T13 refers to control system 200 transitioning from state S6 ("Drain") to state S1 ("Standby"), which occurs when tender controller 70 receives the draining signal with a false value before or during the draining process, or after the draining process has completed. A detection strategy can be employed by tender controller 70 to detect the completion of draining, such that tender controller 70 can command the one or more valves in the drain piping to close.

Transition T14 refers to control system 200 transitioning from state S6 ("Drain") to state S5 ("Disabled"). This can occur when tender controller 70 detects a fault with the draining operation such that draining can no longer be supported draining, which can be caused by an unintentional disconnection of drain piping from cryogenic vessel 50, or due to the variety of faults described in the discussion of state S5 above.

As would be known to those skilled in the technology, in alternative embodiments there can be additional transitions between certain states S1-6 not illustrated in FIG. 2, but which are implicitly captured in FIG. 2 by transitioning through two or more of the illustrated transitions T1-14. The names or naming convention of the states can vary in alternative embodiments while the purpose and function of the states remain substantially the same.

Control system 200 manages the supply of gaseous fuel on tender car 20 by coordinating the various operational modes of the tender car to increase safe and efficient operation of components for delivering, refueling, draining, capturing and storing gaseous fuel. Gaseous fuel is delivered to locomotive 10 in an efficient, safe and timely manner. When cryogenic vessel 50 is being refilled or drained, control system 200 improves the safe handling of gaseous fuel on tender car 20 and safe operation of components that deliver or fuel with gaseous fuel. In the event of faults control system 200 can determine whether to capture and store gaseous fuel in delivery pipes between tender car 20 and locomotive 10 (conduit 100) to reduce the likelihood of venting to atmosphere, and such captured and stored gaseous fuel can be later introduced into engine 40.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for managing a supply of gaseous fuel on a tender car for a locomotive comprising:
    a tender controller configured to interface with a pumping and vaporizing apparatus and a communication link for exchanging information with a locomotive controller, said tender controller programmed:
        to receive a command signal from said locomotive controller through said communication link commanding delivery of gaseous fuel from said tender car to said locomotive;
        to transfer at least one status signal through said communication link to said locomotive controller indicating status of said tender car;
        with a state machine for managing a plurality of operational modes of said tender car, said state machine responsive to said command signal and said at least one status signal to transition between respective operational modes, said state machine comprising a plurality of states representative of said plurality of operational modes, said plurality of states comprising at least one of: a standby state, a start-up state, a deliver state, a refill state, a disabled state, and a drain state; and

TABLE 3

| Transition | From State | To State | Signal Initiating Transition | Signal Value |
| --- | --- | --- | --- | --- |
| T1 | S1 ("Standby") | S2 ("Start-up") | SIG2 ("Gas Request") | True |
| T2 | S2 ("Start-up") | S3 ("Deliver") | SIG4 ("Ready") | True |
| T3 | S3 ("Deliver") | S1 ("Standby") | SIG2 ("Gas Request") | False |
| T4 | S2 ("Start-up") | S1 ("Standby") | SIG2 ("Gas Request") | False |
| T5 | S1 ("Standby") | S4 ("Refill") | SIG6 ("Refill") | True |
| T6 | S4 ("Refill") | S1 ("Standby") | SIG6 ("Refill") | False |
| T7 | S5 ("Disabled") | S1 ("Standby") | SIG3 ("Fault Free") | True |
| T8 | S4 ("Refill") | S5 ("Disabled") | SIG3 ("Fault Free") | False |
| T9 | S3 ("Deliver") | S5 ("Disabled") | SIG3 ("Fault Free") | False |
| T10 | S2 ("Start-up") | S5 ("Disabled") | SIG3 ("Fault Free") | False |
| T11 | S1 ("Standby") | S5 ("Disabled") | SIG3 ("Fault Free") | False |
| T12 | S1 ("Standby") | S6 ("Drain") | SIG7 ("Drain") | True |
| T13 | S6 ("Drain") | S1 ("Standby") | SIG7 ("Drain") | False |
| T14 | S6 ("Drain") | S5 ("Disabled") | SIG3 ("Fault Free") | False | to disable delivery of gaseous fuel to said locomotive when said state machine is in one of said standby state, said start-up state, said refill state, said disabled state and said drain state.

2. The apparatus of claim 1, wherein said communication link comprises at least one of a digital interface, an analog interface, a synchronous communication bus and an asynchronous communication bus.

3. The apparatus of claim 1, wherein said communication link is separable from said tender car.

4. The apparatus of claim 1, wherein said command signal is a gas request signal and wherein said tender controller is further programmed to receive a status signal from said locomotive controller, said status signal from said locomotive controller including a locomotive to tender car handshake signal.

5. The apparatus of claim 1, wherein said at least one status signal comprises a tender car to locomotive handshake signal, a tender car fault free signal or a tender car ready to deliver gaseous fuel signal.

6. The apparatus of claim 1, wherein said tender controller is configured to actuate at least one valve in a fill piping and programmed to command said at least one valve in a fill piping to open when said state machine is in said refill state.

7. The apparatus of claim 1, wherein said tender controller is configured to actuate at least one valve in a drain piping and programmed to command said at least one valve in a drain piping to open when said state machine is in said drain state.

8. The apparatus of claim 1, wherein said gaseous fuel is at least one of butane, ethane, hydrogen, methane, propane, natural gas and mixtures of these fuels.

9. An apparatus for managing a supply of gaseous fuel on a tender car for a locomotive comprising:
a tender controller configured to interface with a pumping and vaporizing apparatus and a communication link for exchanging information with a locomotive controller, said tender controller programmed:
to receive a command signal from said locomotive controller through said communication link commanding delivery of gaseous fuel from said tender car to said locomotive;
to transfer at least one status signal through said communication link to said locomotive controller indicating status of said tender car;
with a state machine for managing a plurality of operational modes of said tender car, said state machine responsive to said command signal and said at least one status signal to transition between respective operational modes, said state machine comprises a plurality of states representative of said plurality of operational modes, said plurality of states comprising at least one of: a standby state, a start-up state, a deliver state, a refill state, a disabled state, and a drain state; and
to disable delivery of gaseous fuel to said locomotive when said locomotive controller sends a shutdown signal to said tender controller.

10. A method of managing a supply of gaseous fuel on a tender car for a locomotive comprising:
receiving, on said tender car, a command signal from said locomotive commanding delivery of gaseous fuel from said tender car to said locomotive;
transmitting at least one status signal from said tender car to said locomotive indicating status of said tender car;
representing a plurality of operational modes of said tender car as a plurality of states, said plurality of states comprising at least one of: a standby state, a start-up state, a deliver state, a refill state, a disabled state, and a drain state;
transitioning between said plurality of states in response to said command signal and said at least one status signal; and
disabling delivery of gaseous fuel to said locomotive when a current state of said locomotive is at least one of said standby state, said start-up state, said refill state, said disabled state and said drain state.

11. The method of claim 10, further comprising receiving a status signal from said locomotive, said status signal from said locomotive including a locomotive to tender car handshake signal and wherein said command signal is a gas request signal.

12. The method of claim 10, wherein said at least one status signal comprises a tender car to locomotive handshake signal, a tender car fault free signal or a tender car ready to deliver gaseous fuel signal.

13. The method of claim 10, further comprising commanding at least one valve in a fill piping to open when a current state of said locomotive is said refill state.

14. The method of claim 10, further comprising commanding at least one valve in a drain piping to open when a current state of said locomotive is said drain state.

15. The method of claim 10, wherein said gaseous fuel is at least one of butane, ethane, hydrogen, methane, propane, natural gas and mixtures of these fuels.

16. A method of managing a supply of gaseous fuel on a tender car for a locomotive comprising:
receiving, on said tender car, a command signal from said locomotive commanding delivery of gaseous fuel from said tender car to said locomotive;
transmitting at least one status signal from said tender car to said locomotive indicating status of said tender car;
representing a plurality of operational modes of said tender car as a plurality of states, said plurality of states comprising at least one of: a standby state, a start-up state, a deliver state, a refill state, a disabled state, and a drain state;
transitioning between said plurality of states in response to said command signal and said at least one status signal; and
disabling delivery of gaseous fuel to said locomotive when said locomotive sends a shutdown signal to said tender car.

* * * * *